(12) United States Patent
Gray et al.

(10) Patent No.: US 11,850,571 B2
(45) Date of Patent: Dec. 26, 2023

(54) MULTI-FUNCTIONALIZED BASIC IMMOBILIZED AMINE SORBENTS FOR REMOVAL OF METAL CONTAMINANTS FROM WASTEWATER

(71) Applicant: United States Department of Energy, Washington, DC (US)

(72) Inventors: McMahan L Gray, Pittsburgh, PA (US); Brian W. Kail, Pittsburgh, PA (US); Walter Christopher Wilfong, Clinton, PA (US); Qiuming Wang, Bridgeville, PA (US); Fan Shi, Pittsburgh, PA (US)

(73) Assignee: United States Department of Energy, Washington, DC (US)

( * ) Notice: Subject to any disclaimer, the term of this patent is extended or adjusted under 35 U.S.C. 154(b) by 386 days.

(21) Appl. No.: 16/933,743

(22) Filed: Jul. 20, 2020

(65) Prior Publication Data
US 2021/0016246 A1    Jan. 21, 2021

Related U.S. Application Data

(60) Provisional application No. 62/875,829, filed on Jul. 18, 2019.

(51) Int. Cl.
*B01D 15/08* (2006.01)
*B01J 20/10* (2006.01)
(Continued)

(52) U.S. Cl.
CPC ............ *B01J 20/265* (2013.01); *B01D 15/08* (2013.01); *B01J 20/103* (2013.01);
(Continued)

(58) Field of Classification Search
CPC .... B01J 20/265; B01J 20/103; B01J 20/3204; B01J 20/3219; B01J 20/3272;
(Continued)

(56) References Cited

U.S. PATENT DOCUMENTS

| | | | |
|---|---|---|---|
| 8,834,822 B1 * | 9/2014 | Gay | B01J 20/3272 502/402 |
| 2018/0100065 A1 | 4/2018 | Gray et al. | |

* cited by examiner

*Primary Examiner* — Benjamin L Lebron
(74) *Attorney, Agent, or Firm* — Aaron R. Keith; Jacob A. Heafner; Michael J. Dobbs

(57) ABSTRACT

This disclosure provides polyamine sorbent compositions for the separation of metals from aqueous solutions. The polyamine sorbent compositions comprise a silica support, an aminosilane bound to the silica support, an epoxysilane bound to the silica support, and a polyamine where the polyamine is chemically tethered onto a solid silica support through via the epoxysilane. The polyamine may be further stabilized within the bulk sorbent through hydrogen bonding interactions with the aminosilane. The sorbent compositions resist leaching by $H_2O$ in an aqueous stream containing heavy oxyanion-based (and other) metals and demonstrate stability over a pH range of 2-14. The sorbent compositions are useful for the separation of metals from aqueous solutions. The cationic heavy metals are captured by the co-existing amine groups (—$NH_2$, —NH, —N) from the polymeric network while additional metal capture capacity is derived from the introduction of a secondary silane linker.

22 Claims, 10 Drawing Sheets

(51) Int. Cl.
    *B01J 20/26*           (2006.01)
    *B01J 20/32*           (2006.01)
    *C02F 1/28*            (2023.01)
    *C02F 103/18*          (2006.01)
    *C02F 101/10*          (2006.01)
    *C02F 101/22*          (2006.01)

(52) U.S. Cl.
    CPC ....... *B01J 20/3204* (2013.01); *B01J 20/3219* (2013.01); *B01J 20/3272* (2013.01); *C02F 1/288* (2013.01); *C02F 1/285* (2013.01); *C02F 2101/103* (2013.01); *C02F 2101/106* (2013.01); *C02F 2101/22* (2013.01); *C02F 2103/18* (2013.01)

(58) Field of Classification Search
    CPC .......... B01D 15/08; C02F 1/288; C02F 1/285; C02F 2101/103; C02F 2101/106; C02F 2101/22; C02F 2103/18
    See application file for complete search history.

| Sorbent | unit | C | H | N | S |
|---|---|---|---|---|---|
| NETL14-34A | wt % | 19.21 | 4.30 | 5.56 | BDL |
| NETL 14-34B | wt % | 18.60 | 3.82 | 4.87 | BDL |
| NETL 14-90A | wt % | 19.85 | 3.84 | 4.54 | 1.00 |
| NETL 181D | wt % | 19.13 | 3.51 | 5.03 | BDL |
| NETL 57A | wt % | 18.93 | 3.45 | 3.90 | BDL |
| NETL53A | wt % | 17.60 | 3.63 | 6.88 | BDL |

FIG. 2

MULTI-FUNCTIONALIZED BASIC IMMOBILIZED AMINE SORBENTS FOR REMOVAL OF METAL CONTAMINANTS FROM WASTEWATER

CROSS-REFERENCE TO RELATED APPLICATIONS

This application claims the benefit of and priority to U.S. Provisional Application 62/875,829 filed Jul. 18, 2019, which is incorporated herein by reference in its entirety.

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relate to capturing a variety of heavy metals with amine-based sorbents, and includes materials, methods of their preparation, and methods for using the compounds described in various applications.

BACKGROUND OF THE INVENTION

Many of the metals included in the US Resource Conservation and Recovery Act (RCRA) are most commonly present in the polyatomic oxy-anion form, making their capture challenging. For example, water soluble Se (in the VI and IV oxidation states) are expressed as the selenite and selenite oxyanions, and chrome, in its most water-soluble form, exists in the chromate oxyanion. Other metals under RCRA include Arsenic, Cadmium, Chromium, Lead, Mercury, Selenium, among others. Sources of these contaminant metals include flue gas desulfurization (FGD) wastewater streams, acid mine drainage (AMD) effluent streams, hydraulic fracturing water (Frac Water), and the like. These heavy metals and radioactive pollutants in aqueous form are known to contaminate drinking water and other terrestrial water sources.

Hanford Site at Washington is a decommissioned nuclear manufacturing facility that generated high-level radioactive wastes (i.e. 99Tc, 129I, 76As, 90Sr, 79Se, etc.) during the years of fuel-reprocessing activities [2-4]. Among those radioactive ions, Technetium-99 (Tc-99) is the most common and most readily available isotope of technetium, which is a major product of the fission of uranium-235 (235U) from a nuclear reactor technetium. The major environmental concern with 99Tc-containing waste is its high environmental mobility under oxidizing states in addition to a long half-life ($2.1 \times 10^5$ yrs). The potential groundwater and river contamination levels are proportional to the amount of contaminants disposed. Hanford site has a total of 53 million gallons waste in 177 tanks, where radioactive Tc-99 anion is among hundreds of contaminants in the tank waste. Sixty-seven tanks have leaked or were suspected to have leaked 1 million gallons or more of liquids into the underlying sediment. Even though most liquids in single shell tanks have been restored into newer double-shell tanks and no leaks were further reported, threats of radioactive ion and other hazardous chemicals leaking into groundwater won't disappear unless the contaminants are removed from the liquid. Thus, the removal of Tc from the nuclear waste is very important.

However, it is a challenging task to selectively recover Tc from water sources because of the overall low concentration of the Tc contained compounds. The waste is highly caustic and may produce hydrogen. Removal of trace Tc-99 from the Hanford tank waste presents significant challenges to all researchers and engineers. Currently, solvent extraction and ion exchange are two of the most successful methods reported to date for effecting the separation and removal of 99TcO4—from aqueous media. However, most of these materials displayed low selectivity, and, additionally, require the use of environmentally unsafe solvents.

Accordingly, it is an object of this disclosure to provide polyamine sorbent compositions comring polyamines and two monomer cross-linkers covalently bonded to a support and method of producing the same. These and other objects, aspects, and advantages of the present disclosure will become better understood with reference to the accompanying description and claims.

SUMMARY OF THE INVENTION

This disclosure provides polyamine sorbent compositions for the separation of metals from aqueous solutions. The polyamine sorbent compositions comprise a silica support, an aminosilane bound to the silica support, an epoxysilane bound to the silica support, and a polyamine where the polyamine is chemically tethered onto a solid silica support through via the epoxysilane. The polyamine may be further stabilized within the bulk sorbent through hydrogen bonding interactions with the aminosilane. The sorbent compositions resist leaching by $H_2O$ in an aqueous stream containing heavy oxyanion-based (and other) metals and demonstrate stability over a pH range of 2-14. The sorbent compositions are useful for the separation of metals from aqueous solutions. The cationic heavy metals are captured by the co-existing amine groups (—$NH_2$, —NH, —N) from the polymeric network while additional metal capture capacity is derived from the introduction of a secondary silane linker.

BRIEF DESCRIPTION OF THE DRAWINGS

These and other features, aspects, and advantages of the multiple embodiments of the present invention will become better understood with reference to the following description, appended claims, and accompanied drawings where:

FIG. 2 depicts a table of composition-based examples of double cross-linked formulas.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of amorphous, organic-functionalized sorbent compositions, methods of their preparation, and methods for using such materials.

Figure 1:
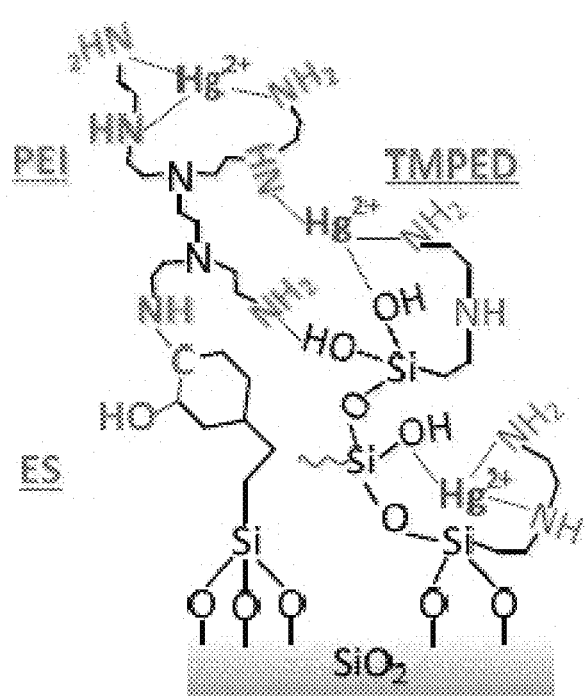
FIG. 1 depicts a pictorial representation of a sorbent composition.

As noted supra, the present disclosure provides sorbent compositions comprising an inorganic solid support, an aminosilane, an epoxysilane, and a polyamine bound to the epoxysilane. FIG. 1 shows the binding site structure, pictorially, of one exemplary sorbent. In FIG. 1 epoxysilane ES serves as a first crosslinker and the aminosilane TMPED serves as a second crosslinker. The polyamine PEI is covalently bound to the epoxysilane and through hydrogen bonding interacts with the aminosilane. In an alternate embodiment, TMPDET aminosilanes may serve as the second crosslinker 2. Thus, FIG. 1 shows a synergistic PEI. . . M+ . . . TMPED binding mechanism in the double-cross-linker sorbent capable of uptake of $Hg^{2+}$ and other metals.

The inorganic support preferentially comprises hydroxyl functional groups which act as reaction sights for the epoxysilane and aminosilane linker components. For example, the Si—OH groups of silica-supported amine/silica sorbents and also Al—OH groups of amine/zeolite sorbents interact chemically with the epoxy linkers to provide a bridge to the absorbing polyamines as well as increase the mechanical and structural integrity of the final sorbent compositions. In a preferred embodiment, the solid support is silica. Alternative embodiments of the present invention include: (1) incorporating different hydroxyl-containing supports, such as SBA 15, MCM-41, zeolite 13X, fumed silica, precipitated silica, silica gel, silica pellets, silica beads, hydroxylated alumina particles or pellets/beads such as those similar to gibbsite, diaspore or boehmite and iron oxide particles with surface hydroxyl groups; and cellulose fibers, chunks, particles, beads.

The solid supports are functionalized by addition of aminosilane and epoxysilane species and further functionalized by addition of polyamines to the epoxysilane. Aminosilanes may include the aminosilanes 3-aminopropyltrimethoxysilane (APTMS, Sigma-Aldrich), N-(3-trimethoxysilyl) propyl)ethylenediamine (TMPED), and N-(3-trimethoxysilylpropyl)diethylenetriamine (TMPDET). Within the sorbent compositions, the aminosilane are covalently bind to and functionalize the solid support.

In addition to the aminosilanes, epoxysilanes are bound to the solid support. Epoxysilanes include epoxysilanes such as 2-(3,4-epoxycyclohexyl)ethyltrimethoxysilane (ECTMS or ES), 2-(3,4-epoxycyclohexyl)ethyltriethoxysilane, 5,6-epoxyhexyltriethoxysilane, 2-(3,4-epoxycyclohexyl)ethylmethyldiethoxysilane, (3-glycidoxypropyl)methyldimethoxysilane, (3-glycidoxypropyl)trimethoxysilane, (3-glycidoxypropyl)dimethylethoxysilane, 1,3-bis[2-(3,4-epoxycyclohexyl)ethyl]tetramethyldisiloxane, (3-Bromopropyl)trimethoxysilane, (3-Iodopropyl)trimethoxysilane, (3-Mercaptopropyl)trimethoxysilane, (3-Chloropropyl)trimethoxysilane, 3-(Trimethoxysilyl)propyl methacrylate and ethoxy versions of these methoxy-based silanes if not mentioned directly above. The epoxysilanes primarily serve as a bridge from the inorganic solid support to functional polyamines.

The sorbent compositions are further functionalized by the addition of polyamines. Polyamines are covalently bound via the epoxysilane bridge/linker to the solid support. The polyamine component attached to the inorganic support via the linker and serve as a sorbent component of the compositions. Additionally, the polyamines may interact to the aminosilanes through hydrogen bonding. The polyamine/aminosilane interaction acts to increase stability to the bulk sorbent.

Polyamines appropriate for the sorbent compositions include polyamines such as: diethylene triamine (DETA), ethylenimine oligomeric mixture ($EI_{423}$, linear/branched mixture with an average molecular weight of about 400 g/mol), polyethylenimine (PEI) with molecular weights between 400 and 20,000, E100 (linear, cyclic, branched mixture) with an average molecular of 250 g/mol-300 g/mol, tetraethylenepentamine (TEPA) linear, with a molecular weight of 198.3, pentaethylenehexamine with a molecular weight of 232.37.

Preferred polyamines for the compositions are polyamines that contain more than one as well as any combination of the following amine groups: primary (—$NH_2$), secondary (—NH), and tertiary (—N) amines. These polyamines may be nearly pure single components or a combination of different polyamines. Examples of polyamines used in the sorbent compositions include the following: ethylenimine oligomer mixture ($EI_{423}$, linear/branched mixture, —N/—NH/—$NH_2$ ratio of 1.3:1:2.2), polyethylenimine with molecular weights between 400 and 20,000 (PEI, —N/—NH/—$NH_2$ ratio of 1.3:1:1.7 for $PEI_{800}$), E100 (linear, cyclic, branched mixture), tetraethylenepentamine (TEPA, linear, —N/—NH/—$NH_2$ ratio of 0:1:0.7), pentaethylenehexamine, and hexaethyleneheptamine. Furthermore, these examples of amines and other potential amines should have but are not limited to a molecular weight (MW) range between 180 and 1,000,000. In a preferred embodiment, the polyamine has a MW ranging from about 200 g/mol to about 1,000,000 g/mol. In a more preferred embodiment, the polyamine has a MW ranging from about 400 g/mol to about 1,000 g/mol.

Preferentially, sorbent compositions may possess an amine loading between 1 and 65 wt %. Preferred sorbent compositions possess an amine loading between 20 and 65 wt %. More preferred sorbent compositions sorbents possess an amine loading between 45 and 65 wt %.

Other preferred polyamines include the polyamines—polyethylenimine (Mw=400 to 1,000,000), ethylenediamine, diethylenetriamine, triethylenetetramine, tetraethylenepentamine, pentaethylenehexamine, hexaethyleneheptamine, 1,3-cyclohexanebis(methylamine), 4,4'-Methylenebis(cyclohexylamine), 3,3'-Methylenedianiline, o-phenylenediamine, m-phenylenediamine, p-phenylenediamine, Tris(2-aminoethyl)amine,p-Xylylenediamine, 4-Chloro-o-phenylenediamine, N,N'-Dimethyl-1,3-propanediamine, N,N'-Diphenyl-p-phenylenediamine, N,N'-Diisopropyl-1,3-propanediamine, polyvinyl amine, poly (allylamine). Most preferred polyamines include polyethylenimine with a MW ranging from about 400 to about 1,000 as in PEI800.

Typical sorbent compositions are comprised of at least 0.1% epoxysilane and aminosilane linker by total dry sorbent composition weight, where total dry sorbent composition weight includes the mass of the inorganic base, polyamine, epoxysil and, and aminosilane. Additionally, the final sorbent compositions may further include additives including polyethyleneglycol or polytetrahydrofuran or other additives. Preferred sorbents are comprised of from about 1% to about 40% epoxysilane and polylinker by total dry BIAS weight. More preferred sorbents are comprised of from about 10% to about 20% linker by total dry BIAS weight.

The sorbent compositions are useful for the separation of metallic species from aqueous sources. Metal targets for the sorbent compositions include the radionuclides Tc, Re, U, I, As, Sr, and Se. Additional metal targets include the RCRA metals Cd, Se, Cr, Ba, Sr, Pb, and Hg.

Preparation

An array of amine-based sorbents with $SiO_2$ as a solid support may be synthesized. The sorbent compositions have two cross-linkers but may be prepared in one step. In one example for preparation of the sorbent compositions comprising the two reactive crosslinkers, an epoxy silane and an aminosilane, were mixed at 20° C. (room temperature) and allowed to react for approximately 5 minutes to form a prepolymer mixture. This was followed by the addition of a polyamine which was reacted with and distributed among the initial prepolymer mixture. The reaction mixture was added to $SiO_2$ particles in a flask using methanol or methanol/water as the solvent. The solvent was then evaporated, and the silica-crosslinker-amine reactions were completed under vacuum between 80 and 90° C. to produce the dry granular sorbent. The sorbents were then washed with 18 MΩ water to remove unreacted amine crosslinkers.

The typical preparation had a duration between 1 and 3 hours, depending on the sorbent formulation. The cross-linkers used in the preparation were associated with different types of sorbents and included (i) aminosilanes, such as 3-aminopropyltrimethoxysilane (APTMS), N-(3-trimethoxysilyl) propyl)ethylenediamine (TMPED), and N-(3-Trimethoxysilylpropyl)diethylenetriamine (TMPDET), (3-Mercaptopropyl)trimethoxysilane (TMPMerc) plus epoxysilane; (ii) epoxysilane, 2-(3,4-epoxycyclohexyl)ethyltrimethoxysilane (ES) for layer-based BIAS sorbent; (iii) tri-epoxide monomer, N-N-diglycidyl-4-glycidyloxyaniline (E3) for monolith based sorbent; and (iv) acrylamide and N,N'-Methylenebis(acrylamide) (MBAA) monomers combined with ammonium persulfate (APS) and N,N,N',N'-Tetramethylethylenediamine Characterization of Stability in $H_2O$ The sorbent compositions were tested for stability in a flowing liquid environment. Testing was accomplished using an accelerated $H_2O$ method which involves contacting 0.5 g of sorbent with 0.5 mL/min of flowing $H_2O$ for 20 min. To assess longer term stability, an identical amount of sorbent was treated with successive amounts of water, in 20 mL increments with each fraction analyzed for amine content. The amount of amine released is compared with the total loaded amine content of the fresh sorbent. The washed sorbent materials were dried at 70° C. in a drying oven, then subjected to thermogravimetric analysis (TGA) in order to determine the percentage of the organic content that was retained (OCR). OCR values were calculated by dividing the organic content of the $H_2O$-treated sorbent by that of the fresh sorbent and multiplying by 100.

Characterization of Heavy Metal Absorption

Sorbent uptake testing is typically conducted by one of two methods. One method is a batch uptake test method. The characterization is performed by agitating 0.04 g to 0.5 g of sorbent in 20 mL of 25-1000 ppm ion solution for 40 minutes at room temperature. The resulting liquid is filtered by a 0.2 μm PVDF filter to remove solid particles.

The second characterization method is a flow uptake test method. The absorption test is accomplished using a similar set-up as the $H_2O$ amine leach testing. The sorbent is directly contacted for 40 minutes by a 0.5 mL/min flow of metal solution at 25-100 ppm. Concentrations of target ions in all solutions were measured using a Nexion 300D ICP-MS. Data was collected in kinetic energy discrimination (KED) mode using 2-4 mL/min He as the collision gas; Indium was used as an internal standard. A calibration curve may be constructed, relating known concentrations of different ions in DI $H_2O$ to the ICP-MS response intensity. This may be used to calculate the ions concentration in the solutions. Mercury analysis may also be conducted by cold vapor atomic absorption spectrometry using U.S. EPA method 245.7.

Characterization of Radionuclide Adsorption Studies

A non-radioactive Re surrogate may be used to study the sorbents' affinity for the $Tc^{99}$ ion due to the expense and environmentally hazardous waste of radionuclides. The capture of Re by stable amine sorbents was conducted by flowing flue gas desulfurization water over the packed sorbent bed and monitoring the amount of Re that elutes from the sorbent bed. Concentrations of ions of interest in all solutions are measured using an ICP-MS.

Wastewater generated from Flue Gas Desulfurization (FGD) was treated using the NETL amine based sorbents. During the treatment, a multitude heavy metals (such as Cr, As, Cd, Hg, Sr, Se, Re, etc.) at very low concentrations were captured. Many of the heavy metals captured from FGD water have radioactive isotopes (76As, 90Sr, and 79Se) which are hazardous fission products because of the high yield and/or relatively long half-life. Re is not radioactive waste, however, the non-radioactive perrhenate ion (ReO4, Re) was used to mimic the radioactive pertechnetate ion (TcO4, 99Tc) because the two ions are sufficiently similar to provide a basis for comparison.

EXAMPLES

In one example, the solid sorbents were prepared with target loadings of 40% (w/w) organic content on a silica support. The sorbents were prepared using a rotary-evaporator set at 80° C., and vessel pressure reduction from atmospheric pressure (1000 mbar) to approximately 20 mbar over a period of 1 hour. The final curing step was performed for 0.5 to 1.5 hours in a rotary-evaporator set at 90° C. and approximately 20 mbar. The relative amount of the two cross-linkers may be varied while the amine content was held constant.

FIG. 2 provides a table of the binding site structure for metal capture of several embodiments of the present invention. The solid sorbents included in FIG. 2 are the sorbents 14-34A, 14-34B, and 14-90A. In 14-90A, the amine content remained very similar to that of 181D, while also including sulfur-based, thioether, or thiolate functionality which may improve capture capacity of heavy metals with high sulfhydryal affinity. Sorbents 14-34A and 14-34B were designed with the addition of TMPED, which possesses linear ethylene diamine functionality and branched primary and secondary amine functionality of the PEI. In these exemplary compositions, the chelating site geometry has been altered to offer increased bi-dentate metal coordination to tune sorbent metal selectivity.

Figure 3:
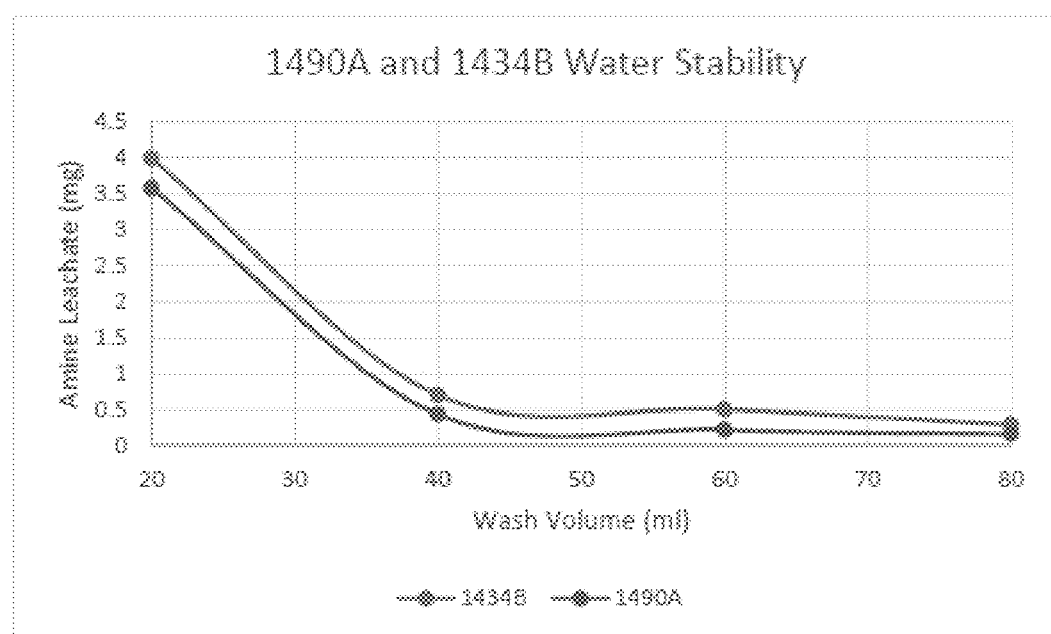
FIG. 3 depicts a graph of leach testing results for a 1.0 wt % secondary ethylene diamine and sulfur-based functionality sorbents.

Initial $H_2O$ stability testing of the immobilized amine sorbents was performed at the natural pH of 5.5, under continuous flow conditions under an approximately 2 mL bed volume of freshly prepared and unwashed sorbent. FIG. 3 illustrates a plot of leach testing results for a 1.0 wt % secondary ethylene diamine (1434B) or sulfur-based functionality (1490A) sorbent. Each data point indicates a 20 mL fraction of 18 MSΩ water feed solution at approximately one quarter bed volume per minute (0.5 mL/min) for high water contact time. The mixed functionality sorbents of the present disclosure demonstrated nearly identical water stability compared to single-crosslinked sorbents.

Figure 4:
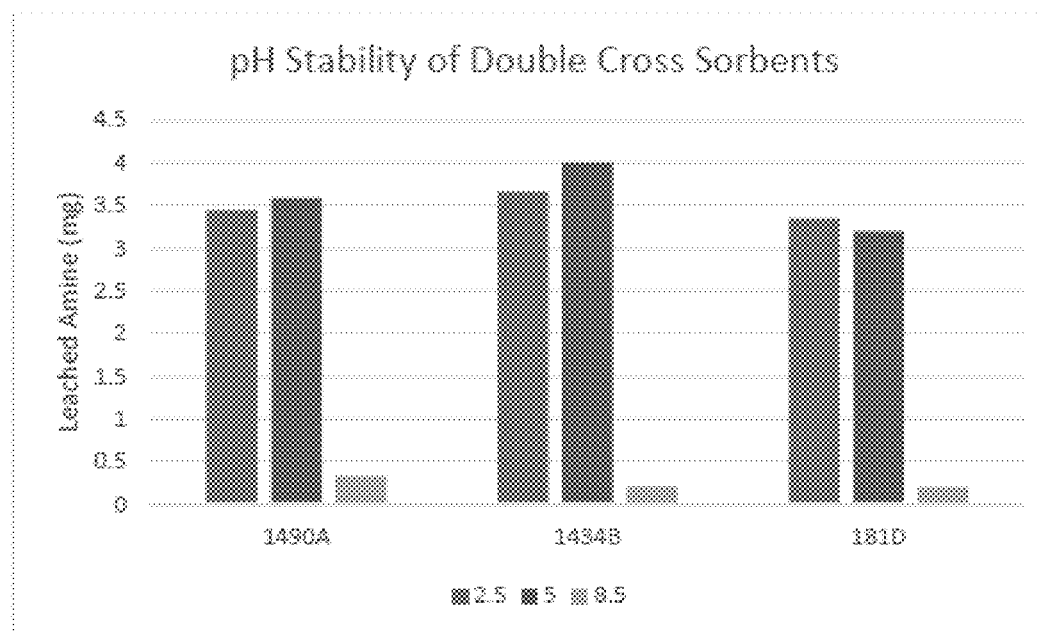
FIG. 4 depicts a graph of the pH stability of double-crosslinked sorbents with identical organic loadings.

Single washes were performed at pH 2.5 (1% acetic acid), pH 5.5 (18 MΩ water) and pH 8.5 (ammonium citrate). FIG. 4 depicts a graph of single wash testing at various pH for 14-90A (1.0 wt % S), 14-34B (1.0 wt % ethylene diamine), and 181D sorbents with identical organic loadings. Typically, a majority of amine leached in the initial washes, however leaching was reduced as the pH of the wash solution increased, as shown in FIG. 4. Stability from pH 2.5 (0.7-0.8% w/w initial amine loss) to pH 8.5 (0.04-0.07% w/w initial amine loss) is also shown in FIG. 4.

Metal Uptake Testing

Figure 5:
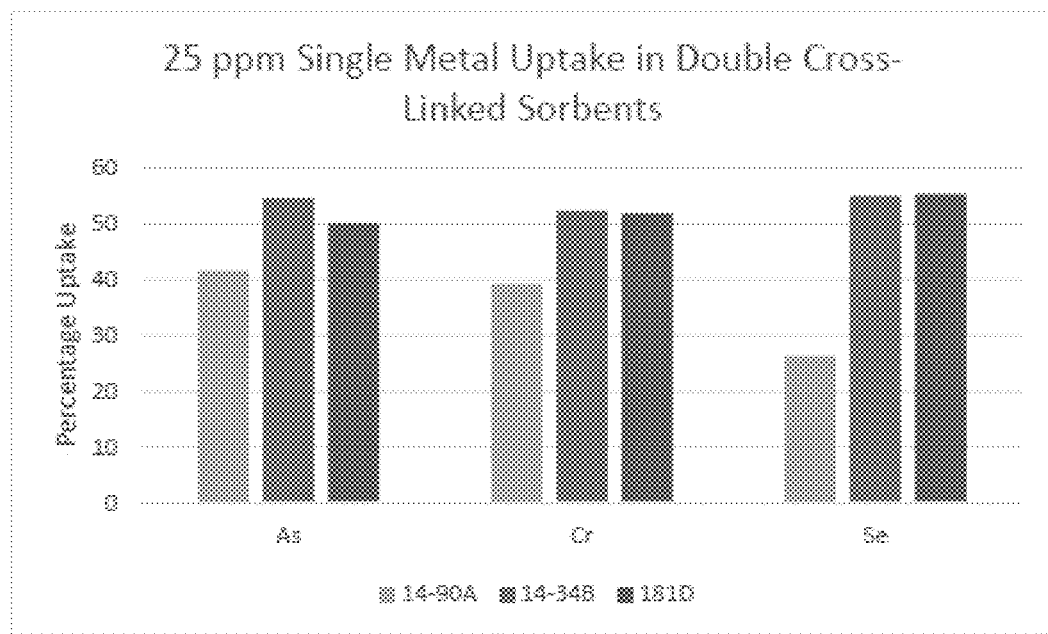
FIG. 5 depicts a graph of metal oxyanion uptakes from single element solutions for mixed functionality amine sorbents and amine-only sorbents.

In one example, heavy metal uptake is performed by comparing the known, immobilized amine-silica sorbent BS181D, and its multifunctional analogues: BS14-90A and BS14-34B, each with 1% (w/w) added functionality. FIG. 5 depicts a graph comparison of metal oxyanion uptakes from single element solutions for mixed functionality amine sorbents and amine only sorbents. FIG. 5 shows the percentage uptake of each sorbent for Cr, As, and Se in pure component solutions at 25 ppm each. In the single-element uptake testing of these heavy metal oxyanions, the amine sorbent (181D) and the amine-ethylene diamine sorbent (14-34B) show similar affinity towards all the oxyanions tested.

Figure 6:
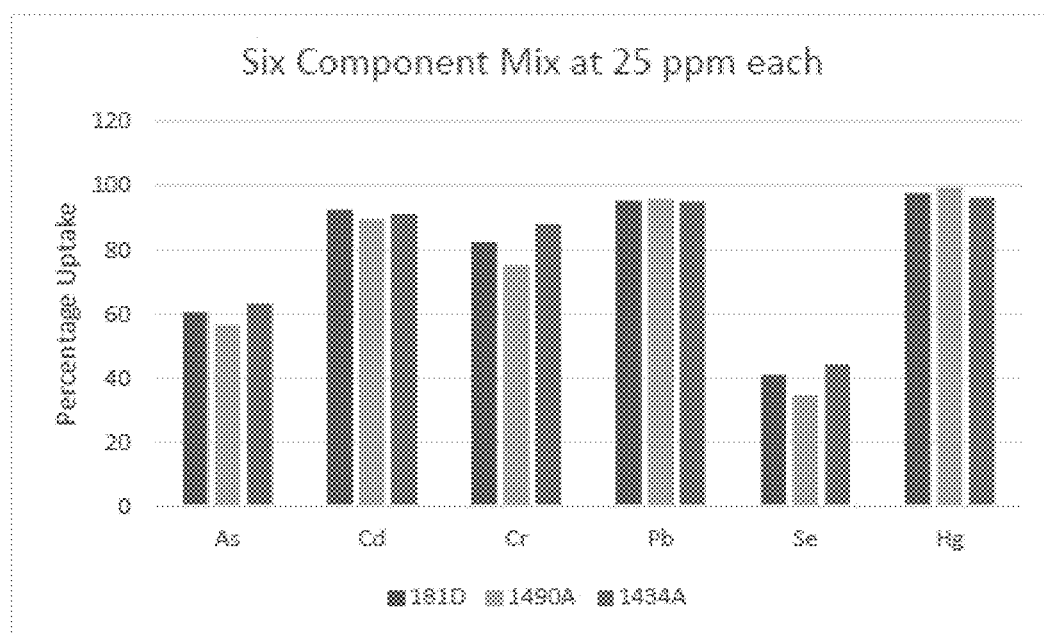
FIG. 6 depicts a graph of single-pass performance of sorbents material for uptake of a mixed component solution.

In one embodiment, the sorbent is used for uptake of heavy metals in a mixed component solution. FIG. 6 depicts a graph of single-pass performance of an approximately 2 mL bed (0.5 g) of sorbent material for uptake of a 25 ppm each, mixed component solution. The three sorbents tested are the known, immobilized amine-silica sorbent BS181D, and its multifunctional analogues: BS14-90A and BS14-34B, each with 1% (w/w) added functionality. The metal uptake testing shown in FIG. 6 includes six heavy metal species as equal parts mixtures at 25 ppm each: three polyatomic oxyanions (As, Se, Cr) and three cationic species (Hg, Cd, Pb).

Multicomponent testing somewhat mirrors the results of the individual 25 ppm uptake tests. However, there is an increase in uptake percentage for a select few metal oxyanions. Chromate uptake increased by approximately 57% in 181D and in 14-34B, and by approximately 90% in 14-90A. Changes in uptake from the multicomponent mixture in 14-90A may result from the chelation of cationic species and subsequent negation of any charge-charge repulsions between the free thiolate and the incoming oxyanion. The changes in uptake in 181D and 14-34B may result from the elimination of the charge-charge repulsion in the existing phenolate groups that are derived from epoxy-ring opening during amine crosslinking.

Figure 7:
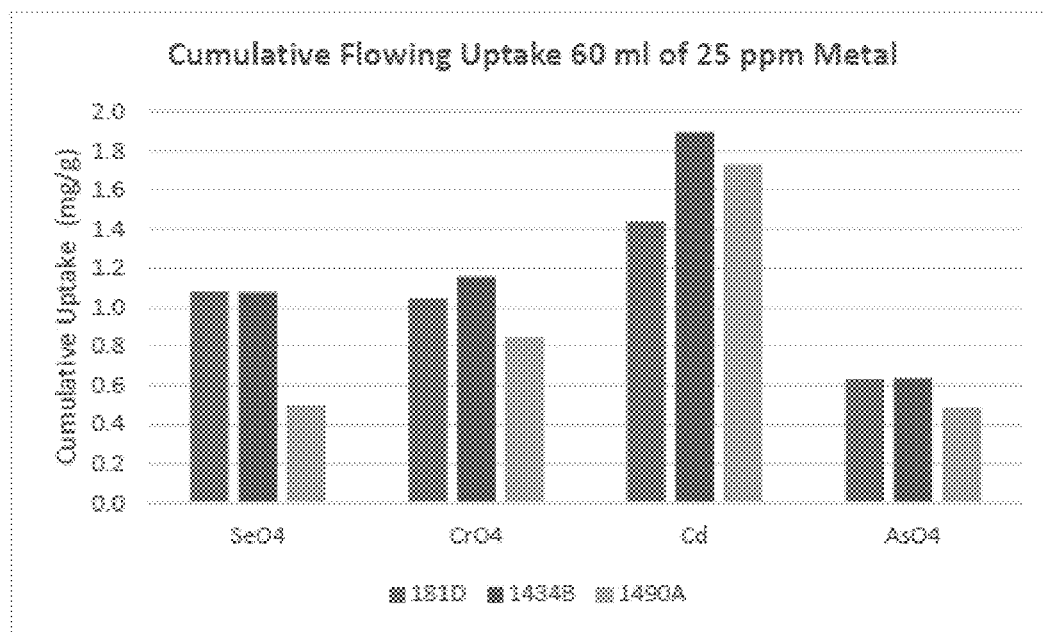
FIG. 7 depicts a graph of cumulative flowing uptake for single component 25 ppm metal solutions at 0.5 g loadings.

FIG. 7 depicts flowing cumulative uptake comparison of a BIAS sorbent 181D and the mixed functionality variant sorbent compositions of the present disclosure for single component 25 ppm metal solutions at 0.5 g loadings. There was an increase of approximately 29% in the total cadmium uptake of the amine-ethylene diamine based sorbent (14-34B) during cumulative, single element loadings, relative to the amine-only sorbent (181D), shown in FIG. 5. There was also an increase of approximately 24% in the total cadmium uptake of the amine-thiolate based sorbent (14-90A) during cumulative, single element loadings, relative to the amine-only sorbent (181D), shown in FIG. 5. Oxyanion metal capacity is unaffected in this single-element loading test, and the presumed charge-charge repulsions in 14-90A may be expressed in reduced total loadings relative to 181D.

Figure 8:
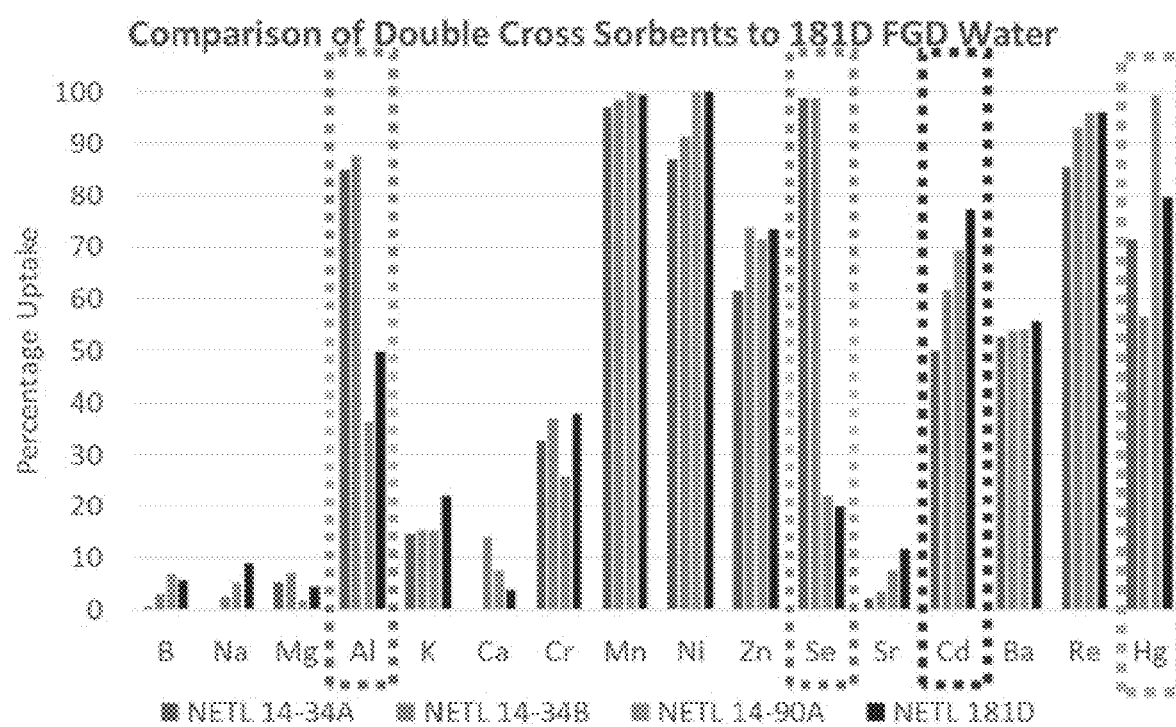
FIG. 8 depicts a graph comparing the BIAS sorbent 181D to the multifunctional sorbents for uptake efficiency from flue gas desulfurization water.

In one embodiment, the sorbent compositions of the present disclosure are useful for the separation of metals from aqueous solutions, for example the uptake of metals in flue gas desulfurization water. FIG. 8 depicts a graph comparing the BIAS sorbent 181D to the multifunctional sorbents described herein: 14-34A (3.0 wt % ethylene diamine), 14-34B (1.0 wt % ethylene diamine), and 14-90A (1.0 wt % thiolate). The uptake efficiency from authentic flue gas desulfurization water for several elements is depicted in FIG. 8. Compared to BIAS sorbent with amine-only functionality, there was an approximately 300% increase in selenium uptake when diamine functionality is added and a 25% increase in mercury uptake when thiolate functionality is added.

Figure 9:
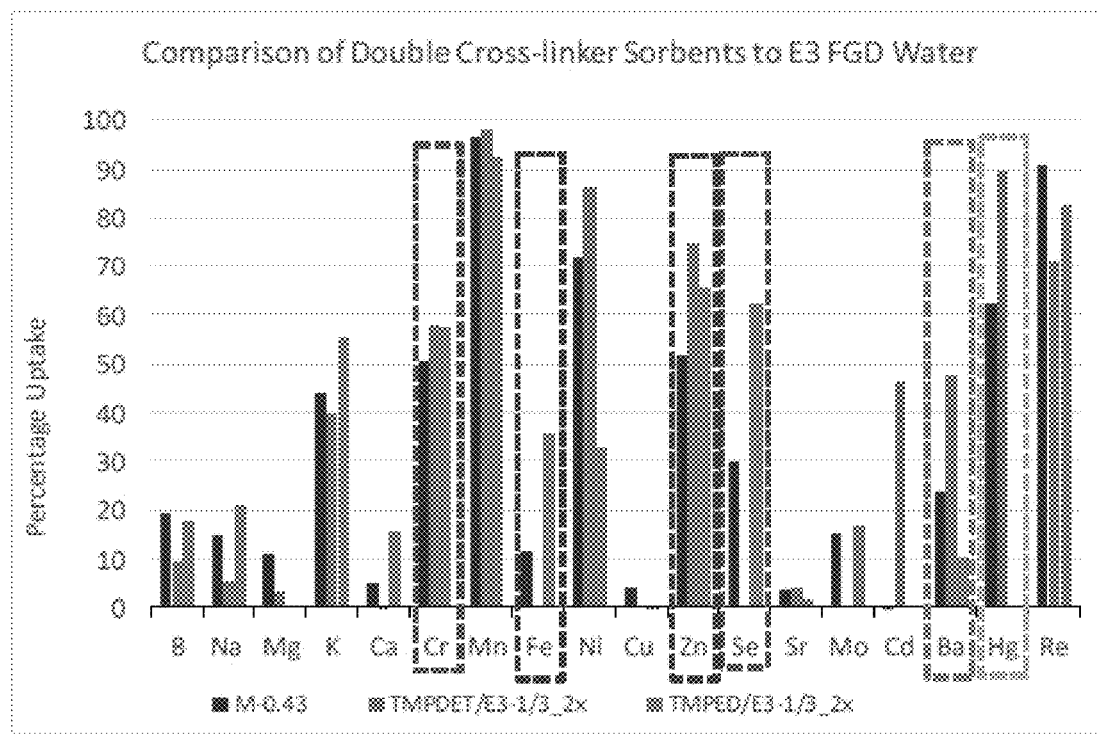
FIG. 9 depicts a graph comparison of the double-cross-linker sorbents to E3 FGD water for uptake efficiency from authentic flue gas desulfurization water.

FIG. 9 depicts a graph comparison of the double-crosslinker sorbents to E3 flue gas desulfurization water for uptake efficiency from authentic flue gas desulfurization water. The sorbents containing PEI and E3 epoxy-based first cross-linker plus the TMPED and TMPDET (diethyenetriamine units) aminosilane-based second cross-linkers demonstrate higher affinities for different metals compared to the affinities of the standard M-0.43 based monolith (only PEI and ES). FIG. 9 shows higher Hg, Ba, Se, and Cr uptake for the double cross-linked, monolith-based sorbents.

Figure 10:
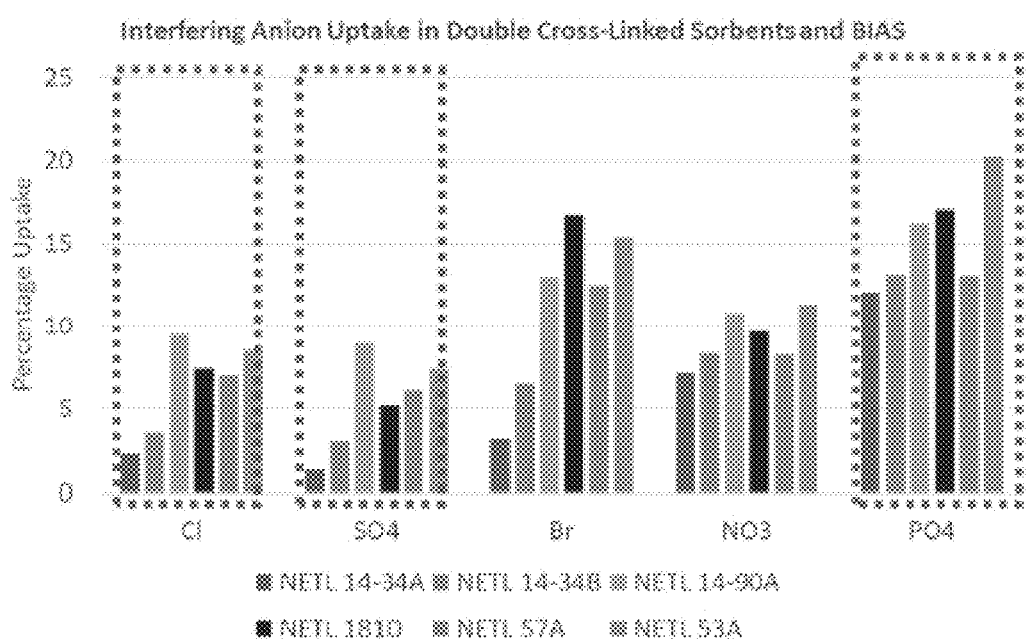
FIG. 10 depicts a graph comparison of sorbent resistance to anionic fouling materials from flue gas desulfurization water

FIG. 10 depicts a graph comparison of sorbent resistance to anionic fouling materials from flue gas desulfurization water. Common anionic fouling materials are Cl, $SO_4$, Br, $NO_3$, and $PO_4$. Three multifunctional sorbents are shown in FIG. 10: 14-34A, 14-34B, and 14-90A. Three traditional BIAS sorbents are shown in FIG. 10 for comparison: 181D, 53A, and 57A. The multifunctional sorbents typically have greater resistance to interfering anions, FIG. 10 shows approximately 50-150% greater resistance compared to the traditional BIAS sorbents.

The sorbent compositions comprising polyamines with at least two different monomer cross-linkers immobilized on silica are structurally stable and capture a variety of toxic heavy metals with higher capacity compared to single-crosslinker sorbents. The double-crosslinker sorbents described here may be utilized to capture heavy metals including, but not limited to, As, Cr, Cd, Hg, Ba, Se, and other heavy metal species typically found in coal waste streams, industrially effluents, and hydraulic fracturing waters. The double-crosslinked sorbents may capture approximately 100% of target metals, for example Hg, Cd, and Pb, from mixed element solutions at concentrations of 25 ppm each. The sorbents described herein may be typically utilized in a flowing or stagnant aqueous system with heavy metal contamination, including industrial effluent, ponds, rivers, lakes, seawater, and groundwater.

The sorbent compositions have a high affinity towards polyatomic oxoanionic forms of heavy metals, while maintaining affinity towards cationic toxic heavy metals, from mixtures, such as flue gas desulfurization water. These sorbents also have high resistance to potentially fouling atomic anions, such as chloride, bromide, and sulfate.

Alternative embodiments of the present invention include the absorption of diverse types of heavy metals in a variety of cleanup strategies from aqueous sources. Another embodiment includes capture of rare earth elements (REE) from liquid sources. Yet another embodiment includes removal of lead from drinking water.

Alternative embodiments of the present invention include the following instances:

(1) Incorporating different hydroxyl-containing supports, such as SBA 15, MCM-41, zeolite 13X, fumed silica, precipitated silica, silica gel, silica pellets, hydroxylated alumina particles or pellets such as those similar to gibbsite, diaspore or boehmite and iron oxide particles with surface hydroxyl groups.

(2) Incorporating different radioactive ion capture species, such as (i) polyamines: diethylenetriamine, triethylenetetramine, tetraethylenepentamine, pentaethylenehexamine, hexaethyleneheptamine, 1,3-cyclohexanebis(methylamine), 4,4'-Methylenebis(cyclohexylamine), 3,3'-Methylenedianiline, o-phenylenediamine, m-phenylenediamine, p-phenylenediamine, Tris(2-aminoethyl)amine, p-Xylylenediamine, 4-Chloro-o-phenylenediamine, N,N'-Dimethyl-1,3-propanediamine, N,N'-Diphenyl-p-phenylenediamine, N,N'-Diisopropyl-1,3-propanediamine, polyvinyl amine, and (ii) aminoacids: arginine, asparagine, aspartic acid, cysteine, methionine, tryptophan, histidine, lysine, glutamine, glutamic acid, and tyrosine.

(3) Incorporating different silane-derived linkers, such as (3-Bromopropyl)trimethoxysilane, (3-Iodopropyl)trimethoxysilane, (3-Mercaptopropyl)trimethoxysilane, (3-Chloropropyl)trimethoxysilane, 3-(Trimethoxysilyl)propyl methacrylate, 3-Glycidyloxypropyl)trimethoxysilane, and ethoxy versions of these methoxy-based silanes.

(4) Incorporating different epoxide monomers or polymers, such as (i) monoepoxides: 1,2-epoxybutane, ethyl glycidyl ether (aliphatic), 3,3-dimethyl-1,2-epoxybutane (sterically hindered), 1,2-epoxy-3-phenoxypropane (aromatic-based, with ether group), (2,3-epoxypropyl)benzene (aromatic-based, bo ether groups), 4-chlorophenyl glycidyl ether (contains a halogen with epoxide); (ii) diepoxides: 1,4-butanediol diglycidyl ether (aliphatic, with ether groups), 1,2,7,8-diepoxyoctane (aliphatic, no ether groups), 1,4-cyclohexanedimethanol diglycidyl ether (aliphatic with cyclohexane group), resorcinol (aromatic-based with ether groups), bisphenol A diglycidyl ether (multiple aromatic groups), poly(Bisphenol A-co-epichlorohydrin), glycidyl end-capped (multiple aromatic groups, polymer), D.E.R 332 (bisphenol A based commercial polymer), EPON 826 (bisphenol A based commercial polymer); (iii) triepoxide: tris(2,3-epoxypropyl) isocyanurate (cyanurate groups), tris(4-hydroxyphenyl)methane triglycidyl ether (aromatic-based, with ether groups), Heloxy 48 (commercial polymer); and (iv) tetraepoxide: 4,4'-methylenebis(N,N-diglycidylaniline) (aromatic based, with tertiary amine groups), tetraphenylolethane glydidyl ether (aromatic based).

(5) Incorporating different acrylic-based bi-vinyl cross-linkers, such as ethylene glycol diacrylate (EGDA), PEG diacrylate (PEGDA), 1,3-Butanediol diacrylate, 1,6-Hexanediol diacrylate (HDODA), Bisphenol A ethoxylate diacrylate, 1,4-Butanediol diacrylate, Glycerol 1,3-diglycerolate diacrylate, Neopentyl glycol diacrylate, Tetra(ethylene glycol) diacrylate (TTEGDA), Poly(propylene glycol) diacrylate, Fluorescein O,O'-diacrylate, Bisphenol F ethoxylate (2 EO/phenol) diacrylate, 1,1,1-trimethylolpropanetriacrylate (TMPTA), and tetraalyloxy ethane (TAOE).

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A double-crosslinked, immobilized amine solid sorbent composition, the composition comprising:
   a silica support covalently bound to a first and a second cross linker,
   wherein an aminosilane is the first cross linker, wherein the aminosilane comprises cross-linked aminosilane monomers,
   wherein an epoxysilane is the second cross linker, and wherein the epoxysilane comprises cross-linked epoxysilane monomers; and,
   a polyamine bound to the epoxysilane, wherein the polyamine is further bound to the aminosilane by hydrogen bonding.

2. The composition of claim 1, where the aminosilane is N-(3-trimethoxysilyl) propyl)ethylenediamine.

3. The composition of claim 1, where the aminosilane is N-(3-trimethoxysilylpropyl)diethylenetriamine.

4. The composition of claim 1, where the epoxysilane is 2-(3,4-epoxycyclohexyl)ethyltrimethoxysilane.

5. The composition of claim 1, where the epoxysilane is 2-(3,4-epoxycyclohexyl)ethyltriethoxysilane.

6. The composition of claim 1, where the polyamine has a molecular weight ranging from 200 g/mol to 20,000 g/mol.

7. The composition of claim 1, where the polyamine is polyethylenimine.

8. The composition of claim 1, where the polyamine is tetraethylenepentamine.

9. The composition of claim 1, where the composition has an amine loading ranging from about 1 to about 65 wt %.

10. The composition of claim 1, where the composition has an amine loading ranging from about 20 to about 65 wt %.

11. The composition of claim 1, where the composition has an amine loading ranging from about 45 to about 65 wt %.

12. The composition of claim 1, further comprising at least one bound metal selected from the group comprising Tc, Re, U, I, As, Sr, and Se.

13. The composition of claim 1, further comprising at least one bound metal selected from the group comprising metals Cd, Se, Cr, Ba, Sr, Pb, and Hg.

14. A method of separating a metal from a liquid source, the method comprising:
supplying a solid sorbent composition comprising:
a. a silica support covalently bound to a first and a second cross linker;
b. wherein an aminosilane is the first cross linker, wherein the aminosilane comprises cross-linked aminosilane monomers;
c. wherein an epoxysilane is the second cross linker, and wherein the epoxysilane comprises cross-linked epoxysilane monomers; and,
d. a polyamine bound to the epoxysilane, wherein the polyamine is further bound to the aminosilane by hydrogen bonding;
exposing solid sorbent composition to the liquid source comprising at least one metal; and,
capturing at least one metal by binding the metal to the solid sorbent composition.

15. The method of claim 14 wherein the at least one metal comprises Se and the solid sorbent captures more than 20% of said Se.

16. The method of claim 15 wherein the at least one metal further comprises Al and the solid sorbent captures more than 50% of said Al.

17. The method of claim 16 wherein the at least one metal further comprises Hg and the solid sorbent captures more than 70% of said Hg.

18. The method of claim 14 wherein the at least one metal comprises Se and the solid sorbent captures more than 30% of said Se.

19. The method of claim 18 wherein the at least one metal further comprises Ni and the solid sorbent captures more than 30% of said Ni.

20. The method of claim 19 wherein the at least one metal further comprises Zn and the solid sorbent captures more than 55% of said Zn.

21. The method of claim 20 wherein the at least one metal further comprises Ba and the solid sorbent captures more than 25% of said Ba.

22. The method of claim 21 wherein the at least one metal further comprises Hg and the solid sorbent captures more than 65% of said Hg.

* * * * *